United States Patent
Chen et al.

(10) Patent No.: US 10,908,463 B2
(45) Date of Patent: Feb. 2, 2021

(54) DISPLAY PANEL, DISPLAY DEVICE AND CONTROL METHOD THEREOF

(71) Applicant: BOE TECHNOLOGY GROUP CO., LTD., Beijing (CN)

(72) Inventors: Chenyu Chen, Beijing (CN); Wenqing Zhao, Beijing (CN); Xiaochuan Chen, Beijing (CN); Xue Dong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 374 days.

(21) Appl. No.: 15/769,027

(22) PCT Filed: Sep. 30, 2017

(86) PCT No.: PCT/CN2017/104755
§ 371 (c)(1),
(2) Date: Apr. 17, 2018

(87) PCT Pub. No.: WO2018/141162
PCT Pub. Date: Aug. 9, 2018

(65) Prior Publication Data
US 2020/0257172 A1    Aug. 13, 2020

(30) Foreign Application Priority Data

Feb. 6, 2017    (CN) .......................... 2017 1 0067076

(51) Int. Cl.
*G02F 1/1343* (2006.01)
*G02F 1/1335* (2006.01)
(Continued)

(52) U.S. Cl.
CPC ........ *G02F 1/134309* (2013.01); *G02F 1/137* (2013.01); *G02F 1/1337* (2013.01);
(Continued)

(58) Field of Classification Search
CPC ...... G02F 1/29; G02F 2001/291; G02F 1/292; G02F 1/133512; G02F 1/133514; G02F 1/1323; G02F 1/133603
See application file for complete search history.

(56) References Cited

U.S. PATENT DOCUMENTS

2011/0261455 A1    10/2011   Sugita et al.
2011/0317399 A1*   12/2011   Hsu ....................... G02F 1/1323
                                                              362/97.1
(Continued)

FOREIGN PATENT DOCUMENTS

CN    102650792 A    8/2012
CN    103018965 A    4/2013
(Continued)

OTHER PUBLICATIONS

International Search Report and Written Opinion for International Appl. No. PCT/2017/104755, dated Jan. 3, 2018.
First Office Action for CN Application No. 201710067076.X, dated Sep. 5, 2018.

*Primary Examiner* — Jessica M Merlin
(74) *Attorney, Agent, or Firm* — Dinsmore & Shohl LLP

(57) ABSTRACT

The present disclosure relates to a display panel, a display device and a control method thereof. A display panel (10) includes: two oppositely-provided base substrates (101, 102); a plurality of liquid crystal regulation units (103) provided between the two base substrates; and a light shielding region (104) and a light transmitting region (105) located on a light emissive side of each of the liquid crystal regulation units, wherein each said liquid crystal regulation unit (103) includes a regulation electrode (31a) and a liquid crystal layer (31b), and the regulation electrode (31a) is used for controlling deflection of liquid crystals in the liquid crystal layer (31b), such that beams incident obliquely towards the light shielding region (104) are reflected by the
(Continued)

liquid crystal layer corresponding to the light shielding region (104) to the light transmitting region (105).

17 Claims, 6 Drawing Sheets

(51) Int. Cl.
    *G02F 1/13357*     (2006.01)
    *G02F 1/1337*     (2006.01)
    *G02F 1/137*     (2006.01)

(52) U.S. Cl.
    CPC .... *G02F 1/13439* (2013.01); *G02F 1/133504* (2013.01); *G02F 1/133512* (2013.01); *G02F 1/133603* (2013.01); *G02F 2203/30* (2013.01)

(56) References Cited

U.S. PATENT DOCUMENTS

| 2016/0230951 A1* | 8/2016 | Lee | F21V 5/002 |
| 2016/0313599 A1* | 10/2016 | Kwon | G02F 1/133621 |
| 2017/0192263 A1* | 7/2017 | Jiang | G02F 1/1323 |

FOREIGN PATENT DOCUMENTS

| CN | 103353694 A | 10/2013 |
| CN | 104570469 A | 4/2015 |
| CN | 105589245 A | 5/2016 |
| CN | 106019687 A | 10/2016 |
| CN | 205656403 U | 10/2016 |
| CN | 106292030 A | 1/2017 |
| CN | 106652960 A | 5/2017 |
| JP | 2014-178475 A | 9/2014 |

* cited by examiner

DISPLAY PANEL, DISPLAY DEVICE AND CONTROL METHOD THEREOF

CROSS-REFERENCE TO RELATED APPLICATIONS

The present application is a U.S. National Stage under 35 U.S.C. § 371 of International Patent Application No. PCT/CN2017/104755 as filed on Sep. 30, 2017, which claims priority to Chinese Patent Application No. 201710067076.X as filed on Feb. 6, 2017. The disclosures of each of these applications is fully incorporated herein by reference.

TECHNICAL FIELD

The present disclosure relates to a display panel, a display device and a control method thereof.

BACKGROUND

With the development of the field of display technologies, various products having a display function appear in daily life, for example, mobile phone, tablet PC, TV set, display, laptop, digital photo frame, navigator and so on. All these products need to be equipped with a display device without an exception.

Nowadays, Thin Film Translator Liquid Crystal Display (briefly referred to as TFT-LCD) is a mainstream display device in the market. A display panel in the TFT-LCD generally includes an upper polarizer and a lower polarizer. The upper polarizer is attached to a light emissive side of the display panel and the lower polarizer is attached to a light incident side of the display panel, and an absorption axis of the upper polarizer is perpendicular to that of the lower polarizer. The polarizers may absorb beams parallel to the absorption axes and allow beams perpendicular to the absorption axes to pass through. The upper polarizer and lower polarizer are used jointly to adjust the directions and the emission rates of beams in the display panel, which may cause the luminance of different display units to be different so as to reach a purpose of displaying images on the display panel.

However, when a display panel in the prior art displays images, both the upper and lower polarizers will absorb a portion of beams with absorption axes, which leads to a low transmission rate of the beams.

SUMMARY

Some embodiments of the present disclosure provide a display panel, a display device and a control method thereof.

According to some embodiments of the present disclosure, a display panel is provided, and the display panel includes: two base substrates oppositely-provided; a liquid crystal regulation unit provided between the two base substrates, and a light shielding region and a light transmitting region located on a light emissive side of the liquid crystal regulation unit; wherein the liquid crystal regulation unit includes a regulation electrode and a liquid crystal layer, and the regulation electrode is configured to control deflection of liquid crystals in the liquid crystal layer, such that beams incident obliquely towards the light shielding region are reflected to the light transmitting region by liquid crystals in the liquid crystal layer.

Optionally, the regulation unit may be a transparent electrode and may include a first transparent electrode and a second transparent electrode, wherein the liquid crystal layer is provided between the first transparent electrode and the second transparent electrode.

Optionally, the regulation electrode may include a plate-shaped first transparent electrode and a plurality of bar-shaped second transparent electrodes arranged in an array. Optionally, the regulation electrode may include: a plurality of bar-shaped first transparent electrodes arranged in an array and a plurality of bar-shaped second transparent electrodes arranged in an array, wherein the plurality of bar-shaped first transparent electrodes and the plurality of bar-shaped second transparent electrodes are in a one-to-one correspondence.

Optionally, the light transmitting region may be provided with a scattering medium pattern thereon, and the light shielding region may be provided with a Black Matrix thereon.

Optionally, the light transmitting region may be provided with a Quantum Dots pattern thereon. Optionally, the light transmitting region may be provided with a color filter thereon, to which scattered particles are attached.

Optionally, the liquid crystal regulation unit may further include an alignment layer located on both sides of the liquid crystal layer.

Optionally, the reflection of the beams incident obliquely towards the light shielding region to the light transmitting region by liquid crystals in the liquid crystal layer may include a total reflection and a partial reflection. That is, the regulation electrode may control deflection of liquid crystals in the liquid crystal layer, such that beams incident obliquely towards the light shielding region are totally or partially reflected to the light transmitting region by the liquid crystal layer corresponding to the light shielding region.

According to some embodiments of the present disclosure, a display device is provided, which includes: the display panel as described above and a backlight source provided on a light incident side of the display panel, wherein the backlight source includes: a plurality of light emitting units arranged in an array, the plurality of light emitting units and the plurality of light transmitting regions of the plurality of liquid crystal regulation units may be in one-to-one correspondence.

Optionally, an incident angle of beams of each light emitting unit of said plurality of light emitting units is greater than or equal to a critical angle $\theta$ of a total reflection of liquid crystals in the liquid crystal layer, wherein the two base substrates are provided in parallel, and the incident angle of beams is equal to an angle between the beam and either of said base substrates.

Optionally, the critical angle $\theta$ satisfies: $\theta=\sin^{-1}(n_0/n_e')$; wherein $n_0$ is a minimum refractive index of the liquid crystal layer; $n_e'$ is a maximum refractive index of the liquid crystal layer.

Optionally, a refractive index of the liquid crystal layer is in a range of 1.5 to 1.8, and the critical angle $\theta$ is 56 degrees.

Optionally, each light emitting unit of the plurality of light emitting units may include: a collimation system, a wire grid polarizer and a light emitting diode (LED) sequentially provided in a direction distal to the display panel.

According to some embodiments of the present disclosure, a method for controlling a display device is provided. The method is applied to the display device as described above. The method may include: controlling deflection of liquid crystals in the liquid crystal layer by controlling a voltage on the regulation electrode, such that beams incident obliquely towards the light shielding region are reflected to the light transmitting region by liquid crystals in the liquid crystal layer corresponding to the light shielding region.

Optionally, the controlling deflection of liquid crystals in the liquid crystal layer by controlling a voltage on the regulation electrode, such that beams incident obliquely towards the light shielding region are reflected to the light transmitting region by liquid crystals in the liquid crystal layer corresponding to the light shielding region comprises: to display a maximum gray scale image, controlling deflection of liquid crystals in the liquid crystal layer by controlling a voltage on the regulation electrode, to make a refractive index of liquid crystals in the liquid crystal layer corresponding to the light transmitting region greater than a refractive index of liquid crystals in the liquid crystal layer corresponding to the light shielding region, such that beams incident obliquely towards the light shielding region are reflected to the light transmitting region by the liquid crystal layer corresponding to the light shielding region.

Optionally, the method further comprises: to display a zero gray scale image, controlling non-deflection of liquid crystals in the liquid crystal layer by controlling a voltage on the regulation electrode, such that beams incident obliquely towards the light shielding region are emitted to the light shielding region. Optionally, the method further comprises: to display a zero gray scale image, controlling refractive indexes of liquid crystals in the liquid crystal layer to be identical by controlling a voltage on the regulation electrode, such that beams incident obliquely towards the light shielding region are emitted to the light shielding region.

Optionally, the method further comprises: to display a zero gray scale image, controlling the refractive index of liquid crystals in the liquid crystal layer corresponding to the light shielding region to be less than the refractive index of liquid crystals in the liquid crystal layer corresponding to the light transmitting region by controlling a voltage on the regulation electrode, such that beams incident obliquely towards the light shielding region are emitted to the light shielding region. Optionally, the method further comprises: when it is necessary to display an n gray scale image, controlling deflection of liquid crystals in the liquid crystal layer by controlling a voltage on the regulation electrode, such that one portion of beams incident obliquely towards the light shielding region is emitted to the light shielding region, and another portion is emitted to the light transmitting region, where 0<n<m, and m is a maximum gray scale.

DETAILED DESCRIPTION

In order to make the objectives, technical solutions, and advantages of the present disclosure clearer, the implementations of the present disclosure are further described in detail below with reference to the accompanying drawings.

The display panel, the display device and the method control thereof as provided by some embodiments of the present disclosure may control deflection of liquid crystals in the liquid crystal layer with a regulation electrode in the liquid crystal regulation unit, such that beams incident obliquely towards the light shielding region are partially or totally reflected by the liquid crystal layer corresponding to the light shielding region to the light transmitting region, without using any polarizer to adjust beams by absorbing polarized light parallel to an absorption axis of the polarizer. The utilization rate of beams is increased such that the transmission rate of beams in the display panel is increased.

Figure 1A:
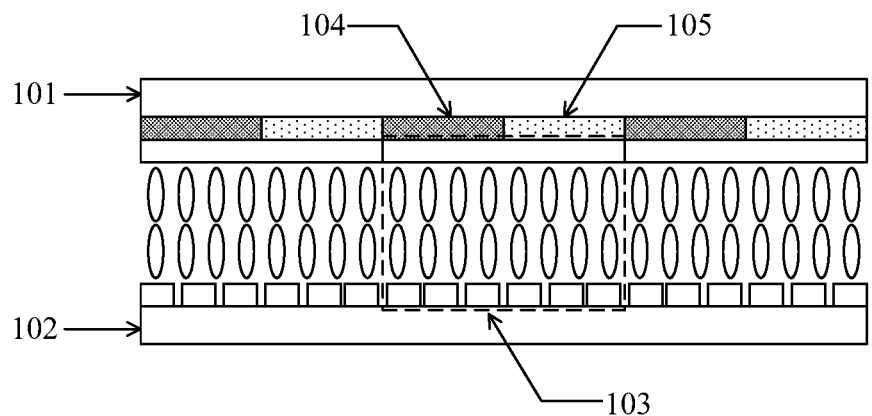
FIG. 1A is a structural schematic diagram of a display panel as provided by some embodiments of the present disclosure.

For example, some embodiments of the present disclosure provide a display panel 10. As shown in FIG. 1A, the display panel 10 may include two oppositely-provided base substrates, namely a first base substrate 101 and a second base substrate 102. For example, the two base substrates 101 and 102 may be provided in parallel.

As shown in FIG. 1A, between the two base substrates 101 and 102, a plurality of liquid crystal regulation units 103 may be formed, as well as a light shielding region 104 and a light transmitting region 105 located on a light emissive side of each of the plurality of liquid crystal regulation units 103. As an example, the light shielding region 104 may be provided with a Black Matrix (briefly referred to as BM) thereon, and the light transmitting region 105 may be provided with a scattering medium pattern thereon.

Optionally, an orthographic projection of the light shielding region 104 and the light transmitting region 105 on the second base substrate 102 may totally cover an orthographic projection of the liquid crystal regulation unit 103 on the second base substrate 102. In other words, there is no gap between the light shielding region 104 and the light transmitting region 105. In this way, a light leakage phenomenon may be avoided.

Figure 1B:
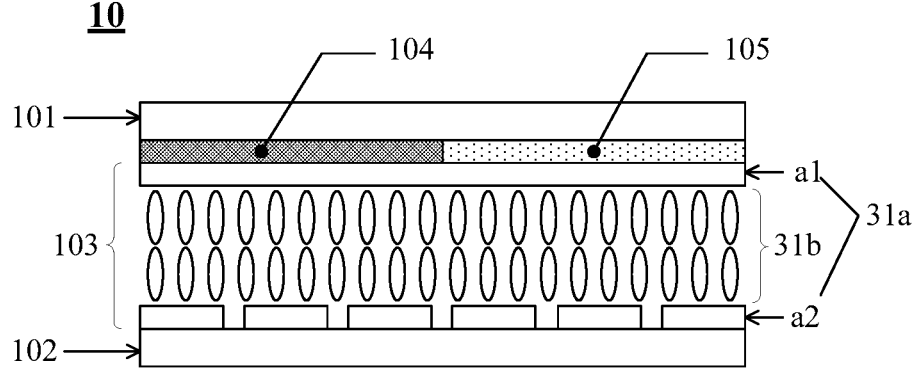
FIG. 1B is a partially enlarged schematic diagram of the display panel as shown in FIG. 1A.

Specifically referring to FIG. 1B, each liquid crystal regulation unit 103 may include: a regulation electrode 31a and a liquid crystal layer 31b. The regulation electrode 31a is used for controlling deflection of liquid crystals in the liquid crystal layer 31b, such that beams incident obliquely towards the light shielding region 104 are reflected by the liquid crystal layer corresponding to the light shielding region 104 to the light transmitting region 105.

To sum up, the display panel as provided in some embodiments of the present disclosure may control deflection of liquid crystals in the liquid crystal layer with the regulation electrode in the liquid crystal regulation unit, such that beams incident obliquely towards the light shielding region are partially or totally reflected by the liquid crystal layer corresponding to the light shielding region to the light transmitting region, without using any polarizer to adjust beams by absorbing polarized light parallel to an absorption axis of the polarizer. The utilization rate of beams is increased such that the transmission rate of beams in the display panel is increased.

Optionally, the regulation electrode is a transparent electrode, and the regulation electrode 31a may include: a first transparent electrode a1 and a second transparent electrode a2, and a liquid crystal layer 31b is provided between the first transparent electrode a1 and the second transparent electrode a2.

Figure 2:
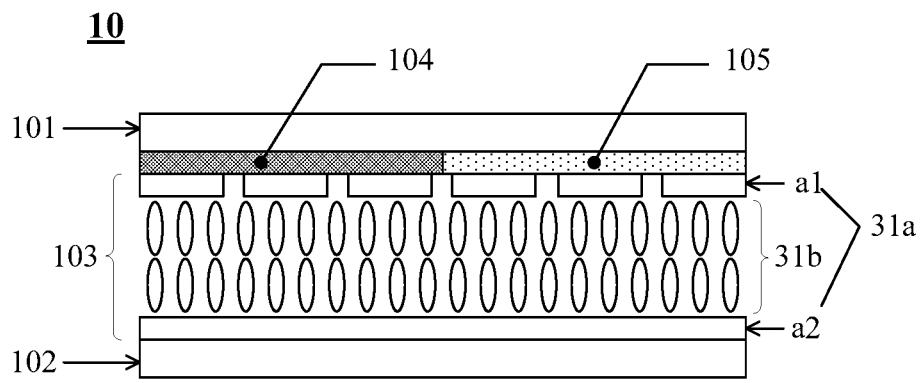
FIG. 2 is a structural schematic diagram of another display panel as provided by some embodiments of the present disclosure.
Figure 3:
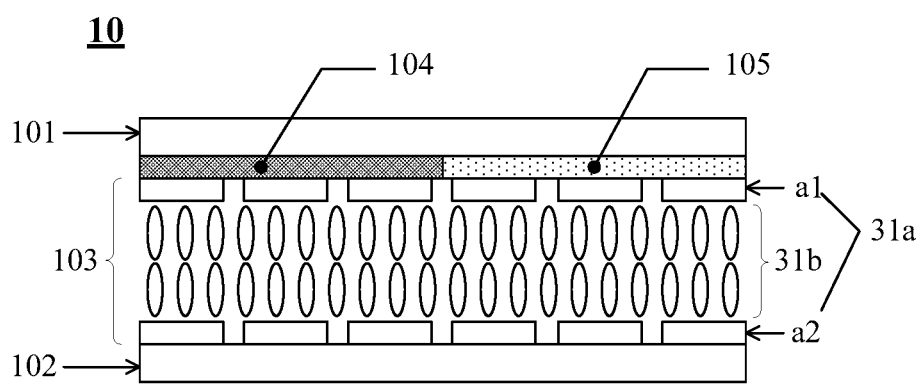
FIG. 3 is a structural schematic diagram of yet another display panel as provided by some embodiments of the present disclosure.

Optionally, in some embodiments of the present disclosure, the regulation electrode 31a may have various structures. For the purpose of illustration herein, it is assumed that the first transparent electrode a1 is located on the light emissive side of the liquid crystal layer 31b, and the second transparent electrode a2 is located on the light incident side of the liquid crystal layer 31b. Then a structure of the regulation electrode 31a may include:

a first structure, in which, as shown in FIG. 1B, the regulation electrode 31a may include: a plate-shaped first transparent electrode a1, and a plurality of bar-shaped second transparent electrodes a2 arranged in an array;

a second structure, in which, as shown in FIG. 2, the regulation electrode 31a may include: a plurality of bar-shaped first transparent electrodes a1 arranged in an array, and a plate-shaped second transparent electrode a2;

a third structure, in which, as shown in FIG. 3, the regulation electrode 31a may include: a plurality of bar-shaped first transparent electrodes a1 arranged in an array, and a plurality of bar-shaped second transparent electrodes a2 arranged in an array, wherein the plurality of first transparent electrodes a1 and the plurality of second transparent electrodes a2 are in a one-to-one correspondence.

It should be noted that, at least one of the first transparent electrode and the second transparent electrode in the regulation electrode includes a plurality of bar-shaped electrodes arranged in an array, which can cause liquid crystals of a liquid crystal layer corresponding to a different electrode in each liquid crystal regulation unit to have a different refractive index by applying different voltages to the plurality of electrodes arranged in an array such that conditions of a total reflection of beams may be satisfied. In particular, referring to FIG. 4, a relationship between a magnitude of the applied voltage and the refractive index of liquid crystal is shown, where the ordinate represents voltage in volts, and the abscissa represents the refractive index of liquid crystal. When the voltage is between 2 to 8 volts, the greater the voltage, the higher the refractive index of liquid crystal. As an example, when the voltage is 0 to 2 volts, the refractive index of liquid crystal is 1.5, and when the voltage is increased to 8 volts or more, the refractive index of liquid crystal is 1.8. Some embodiments of the present disclosure do not restrict the number of the plurality of electrodes arranged in an array.

In some embodiments of the present disclosure, by controlling a voltage between the first electrode and the second electrode, incident beams are reflected onto the scattering medium pattern by utilizing the total reflection principle. Assume that, by controlling the voltage between the first electrode and the second electrode, at least two liquid crystal regions having different refractive indexes are formed in the liquid crystal layer (such circumstance may be regarded as the formation of a liquid crystal prism in the liquid crystal layer). When incident beams incident obliquely from a liquid crystal region having a high refractive index to a liquid crystal region having a low refractive index, a total reflection may occur in case where the incident angle satisfies certain conditions. Optionally, the incident angle may be greater than or equal to a critical angle θ of the total reflection of liquid crystal, wherein the incident angle is an angle between incident beams and a normal line of the reflective interface of the liquid crystal layer. The reflective interface is perpendicular to the base substrates, and its normal line is parallel to the base substrates. Since the two base substrates are provided in parallel, the incident angle is equal to an angle between incident beams and either of the base substrates.

Optionally, the critical angle θ of a total reflection of liquid crystal in the liquid crystal layer satisfies: $\theta = \sin^{-1}(n_o/n_e')$, where $n_o$ is the minimum refractive index of the liquid crystal layer; $n_e'$ is the maximum refractive index of the liquid crystal layer. In practical applications, the refractive index of the liquid crystal layer is commonly in a range of 1.5 to 1.8. By substituting the minimum refractive index 1.5 and the maximum refractive index 1.8 into the above formula, the critical angle θ may be calculated as 56 degrees.

Figure 5:
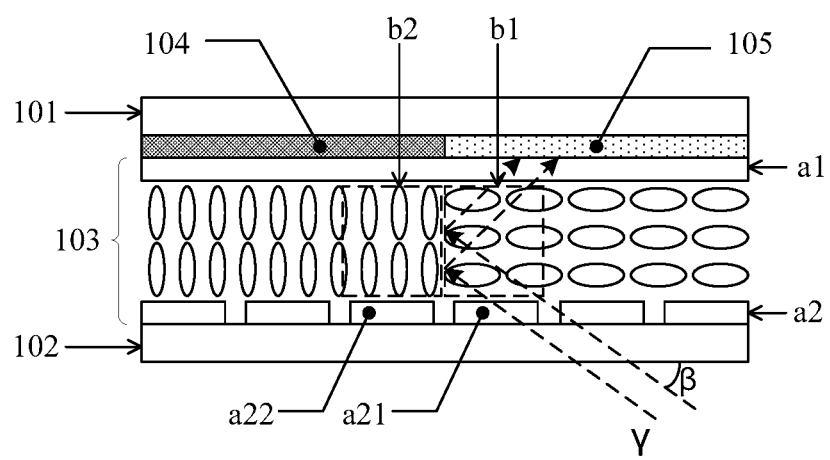
FIG. 5 is a schematic diagram of a beam transmission in the display panel as shown in FIG. 1.
Figure 6:
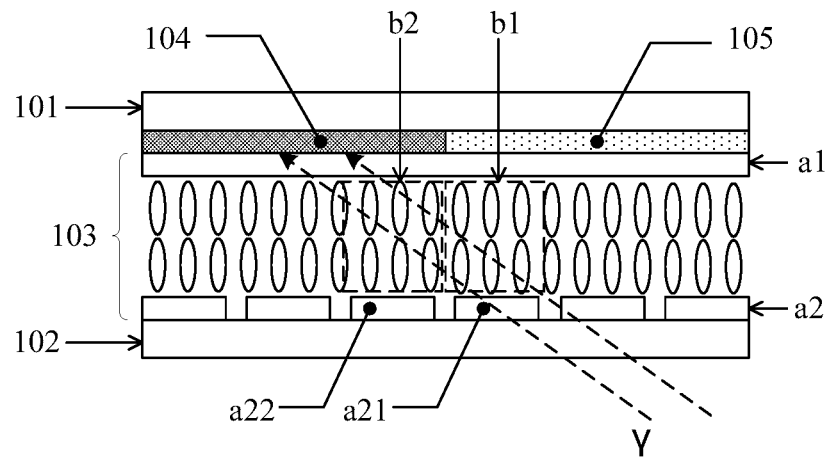
FIG. 6 is a schematic diagram of another beam transmission in the display panel as shown in FIG. 1.

As an example, assume that the structure of the regulation electrode is the above first structure, and the second transparent electrode a2 includes electrodes a21 and a22. A first voltage may be applied to the electrode a21, and a second voltage may be applied to the electrode a22. As shown in FIG. 5, when the first voltage is greater than the second voltage, the extent of deflection of liquid crystals in the first liquid crystal region b1 corresponding to the electrode a21 is greater than the extent of deflection of liquid crystals in the second liquid crystal region b2 corresponding to the electrode a22, such that liquid crystal regions having different refractive indexes may be formed in the same pixel unit. When incident beams γ are incident from a first crystal region b1 having a high refractive index (an optically denser medium) to a second liquid crystal region b2 having a low refractive index (an optically thinner medium), and the incident angle β satisfies $\sin \beta \geq t1/t2$, where t1 is the refractive index of the first liquid crystal region, and t2 is the refractive index of the second liquid crystal region, a total reflection of incident beams γ may occur, the incident beams γ are totally reflected to the light transmitting region 105, and a maximum gray scale image is displayed. As shown in FIG. 6, when no voltage difference is formed on the regulation electrode 31a (i.e., no drive voltage is applied), liquid crystal molecules of the liquid crystal layer are not deflected, and the refractive index of the first liquid crystal region b1 corresponding to the electrode a21 is equal to that of the second liquid crystal region b2 corresponding to the electrode a22. The incident beams γ do not satisfy conditions of the total reflection, and are totally emitted to the light shielding region 104 through the liquid crystal layer, and a zero gray scale image is displayed.

Figure 4:
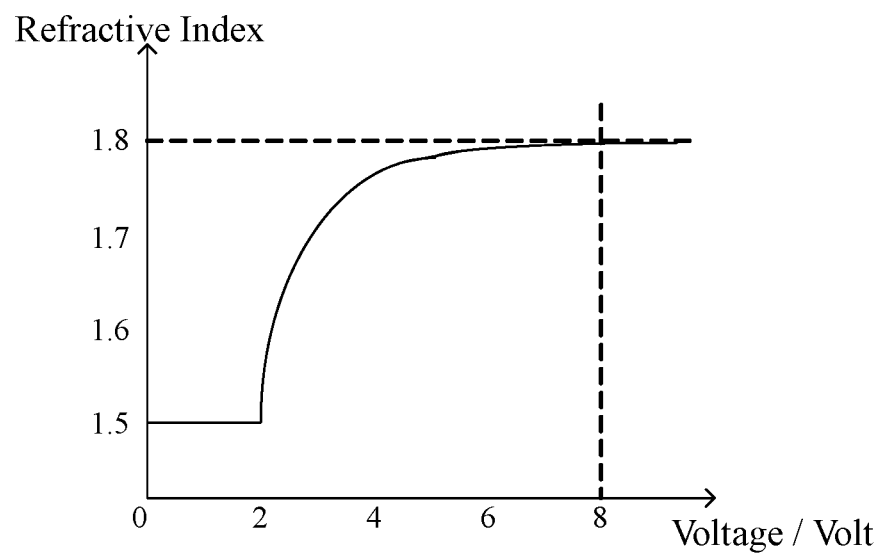
FIG. 4 is a schematic diagram of a relationship between a applied voltage and the refractive index of liquid crystal as provided by some embodiments of the present disclosure

In some embodiments, the first voltage may be equal to the second voltage (which is not 0 volt), or the first voltage and the second voltage may be both between 0 to 2 volts or both greater than 8 volts (for example, referring to FIG. 4). Under such circumstances, the refractive index of the first liquid crystal region b1 corresponding to the electrode a21 is also equal to that of the second liquid crystal region b2 corresponding to the electrode a22. The incident beams γ do not satisfy conditions of the total reflection, and may be totally emitted to the light shielding region 104 through the liquid crystal layer, and a zero gray scale image is displayed.

In some embodiments, the first voltage may be less than the second voltage, such that the refractive index of the first liquid crystal region b1 corresponding to the electrode a21 is less than that of the second liquid crystal region b2 corresponding to the electrode a22. The incident beams γ do not satisfy conditions of the total reflection, and may be partially emitted to the light shielding region 104 through the liquid crystal layer, and a zero gray scale image is displayed.

Optionally, the maximum gray scale image may be a 255-gray scale image, i.e., the maximum gray scale is 255.

Figure 7:
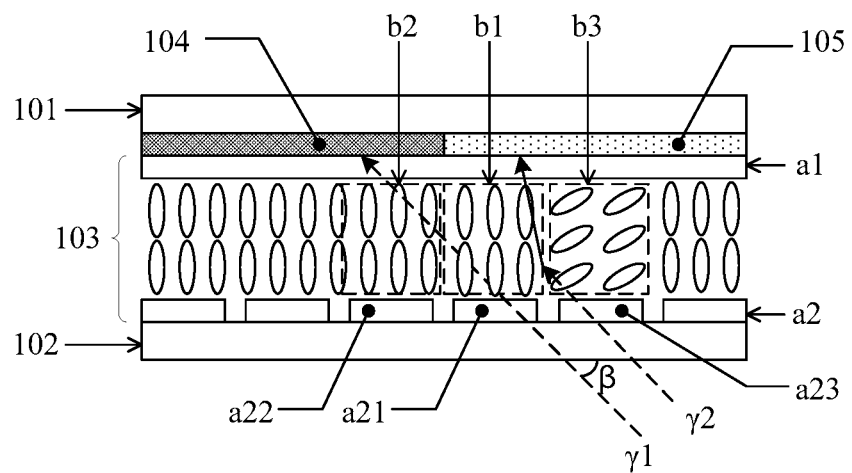
FIG. 7 is a schematic diagram of yet another beam transmission in the display panel as shown in FIG. 1.

Optionally, as shown in FIG. 7, the second transparent electrode a2 may further include an electrode a23, wherein the electrode a23 corresponds to a third liquid crystal region b3. Different voltages may be applied to the electrode a21, the electrode a22 and the electrode a23, such that when a portion of incident beams γ1 are incident from the first liquid crystal region b1 to the second liquid crystal region b2, it is emitted to the light shielding region 104 without the occurrence of the total reflection. When the other portion of incident beams γ2 are incident from the third liquid crystal region b3 to the first liquid crystal b1, the total reflection or refraction occurs, such that it is emitted to the light transmitting region 105. In FIG. 7, the occurrence of refraction of the other portion of incident beams γ2 is taken as an example for explanations. An n gray scale image may be displayed, where 0<n<m, m is the maximum gray scale, for example, m may be 255.

In some embodiments of the present disclosure, by controlling the extent of deflection of liquid crystals, the direction of the incident beams may be changed. The light shielding region is utilized to shield beams and/or make beams pass through the scattering medium pattern, such that different gray scales may be displayed, and the purpose of displaying images may be reached. The display panel as provided by some embodiments of the present disclosure may have a transmission rate up to 10%, while the display panel for displaying images with polarizers currently in use has a transmission rate of about 5%. The transmission rate of the display panel is greatly increased, and the utilization rate of beams is improved.

Optionally, the light transmitting region may be provided with a Quantum Dots (briefly referred to as QD) pattern thereon, and the QD pattern is made of a QD material. When incident beams are reflected to the QD pattern through the liquid crystal layer, the QD pattern may emit light in a scattered way under excitation of incident beams, such that parallel beams emitted from the liquid crystal regulation unit may be emitted in a scattered way after passing through the scattering medium pattern, so as to make the display brightness of the pixel units uniform. Since the QD material may emit fluorescent light of different colors, there is no need to attach any color filter, and the manufacture process is simplified.

Optionally, the light transmitting region may be provided with a color filter thereon, to which scattered particles are attached. The scattered particles cause parallel beams emitted from the liquid crystal regulation unit to be emitted in a scattered way after being filtered by the color filter, so as to make the display brightness of pixel units in the display panel uniform. In particular, the material of scattered particles may be Polyethylene terephthalate (briefly referred to as PET).

Figure 8:
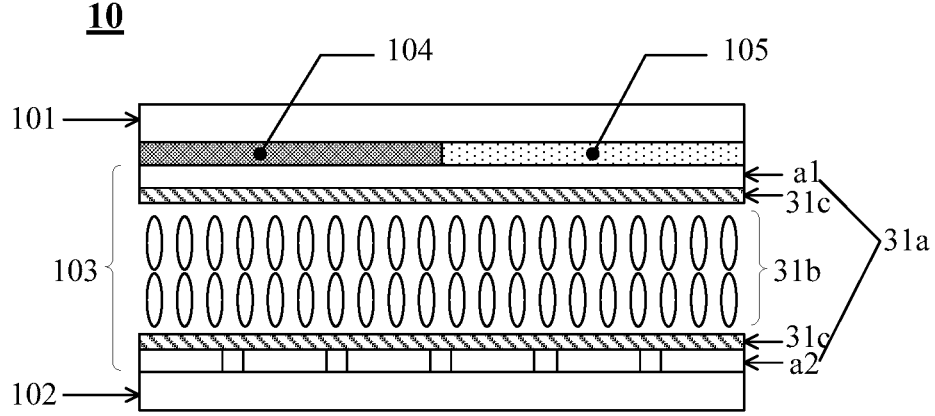
FIG. 8 is a structural schematic diagram of yet another display panel as provided by some embodiments of the present disclosure.

Since the color filter has a strong absorption capability of beams, when the scattering medium pattern is a QD pattern, the transmission rate of beams may be effectively increased. In practical applications, as shown in FIG. 8, the liquid crystal regulation unit 103 may further include: an alignment layer 31c located on both sides of the liquid crystal layer 31b. The alignment layer may cause liquid crystals in the liquid crystal layer to be arranged according to a certain rule.

To sum up, the display panel as provided by some embodiments of the present disclosure may control deflection of liquid crystals in the liquid crystal layer with a regulation electrode in the liquid crystal regulation unit, such that beams incident obliquely towards to the light shielding region are partially or totally reflected by the liquid crystal layer corresponding to the light shielding region to the light transmitting region, without the use of any polarizer to adjust beams by absorbing polarized light parallel to the absorption axis of the polarizer. The utilization rate of beams is increased, such that the transmission rate of beams in the display panel is increased.

Figure 9:
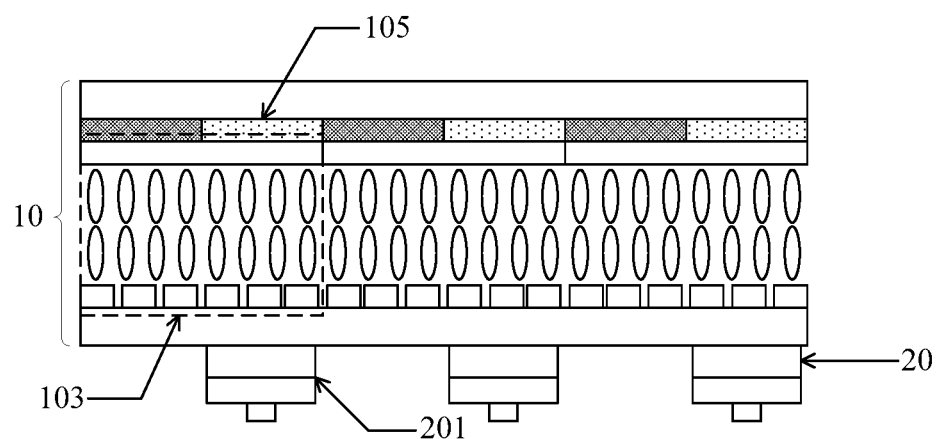
FIG. 9 is a structural schematic diagram of a display device as provided by some embodiments of the present disclosure.

The present disclosure provides a display device, as shown in FIG. 9, including: a display panel 10 and a backlight source 20 provided on a light incident side of the display panel 10, wherein the display panel may be the display panel 10 as shown in any one of FIGS. 1A to 3 and FIG. 8. The backlight source 20 may include: a plurality of light emitting units 201 arranged in an array, the plurality of light emitting units 201 and the light transmitting regions 105 on the plurality of liquid crystal regulation units 103 being in a one-to-one correspondence.

To sum up, a display device as provided by some embodiments of the present disclosure may control deflection of liquid crystals in the liquid crystal layer with the regulation electrode in the liquid crystal regulation unit, such that beams incident obliquely towards to the light shielding region are partially or totally reflected by the liquid crystal layer corresponding to the light shielding region to the light transmitting region, without the use of any polarizer to adjust beams by absorbing polarized light parallel to the absorption axis of the polarizer. The utilization rate of beams is increased, such that the transmission rate of beams in the display panel is increased.

Optionally, the incident angle of beams of each light emitting unit is greater than or equal to the critical angle θ of total reflection of liquid crystals in the liquid crystal layer, such that beams emitted from the light emitting units may satisfy conditions for performing a total reflection in the liquid crystal layer. In particular, the incident angle of beams is an angle between incident beams and a normal line of the reflective interface of the liquid crystal layer. The reflective interface is perpendicular to the base substrates, and its normal line is parallel to the base substrates. Since the two base substrates are provided in parallel, the incident angle of beams of the light emitting units is equal to an angle between beams and either of the base substrates.

Figure 10:
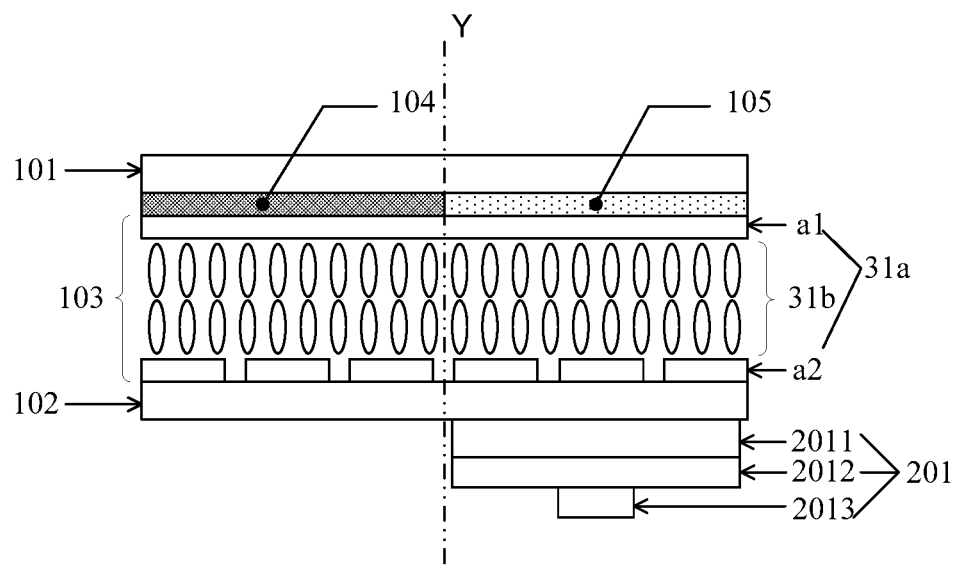
FIG. 10 is a partially enlarged schematic diagram of the display device as shown in FIG. 9.

It should be noted that, as shown in FIG. 10, in each liquid crystal regulation unit 103, the light emitting unit 201 and the light shielding region 104 are located on two sides of a longitudinal section Y of the liquid crystal regulation unit 103. When the incident angle is infinitely close to 90 degrees, a reflective angle of reflected beams is also close to 90 degrees. If there is an overlapping portion between an orthogonal projection of the light emitting unit on the base substrate and an orthogonal projection of the light shielding region on the base substrate, it will cause a portion of totally-reflected beams to be shielded by the light shielding region, and the utilization rate of beams will be affected. Providing the light emitting unit and the light shielding region to be located on two sides of a longitudinal section of the pixel unit may guarantee that beams are emitted to the light transmitting region after totally reflected in the liquid crystal layer, prevent beams from being shielded by the light shielding region, and improve the transmission rate of beams. In particular, the longitudinal section Y is perpendicular to the base substrates.

Optionally, the critical angle θ of a total reflection of liquid crystals in the liquid crystal layer satisfies $\theta = \sin^{-1}(n_0/n_e')$, where $n_0$ is the minimum refractive index of the liquid crystal layer; $n_e'$ is the maximum refractive index of the liquid crystal layer. In practical applications, the refractive index of the liquid crystal layer is commonly in a range of 1.5 to 1.8. By substituting the minimum refractive index 1.5 and the maximum refractive index 1.8 into the above formula, the critical angle θ may be calculated as 56 degrees.

Optionally, as shown in FIG. 10, the light emitting unit 201 may include: a collimation system 2011, a Wire Grid Polarizer (WGP) 2012, and a Light-Emitting Diode (briefly referred to as LED) 2013 that are sequentially arranged in a direction distal to the display panel 10. In particular, the Light-Emitting Diode may be an Infrared Emitting Diode (briefly referred to as ILED). The Wire Grid Polarizer may cause beams emitted from the LED to become polarized light, and then incident beams may be converted into parallel beams by the collimation system, which facilitates the control of an incident angle of incident beams such that conditions for a total reflection may be satisfied when incident beams are transmitted in the liquid crystal layer.

It should be noted that, one may refer to the structure of the display panel in the above described embodiments for the specific structure of the display panel 10, which is omitted here.

To sum up, the display device as provided by some embodiments of the present disclosure may control deflection of liquid crystals in the liquid crystal layer with the regulation electrode in the liquid crystal regulation unit, such that beams incident obliquely towards to the light shielding region are partially or totally reflected by the liquid crystal layer corresponding to the light shielding region to the light transmitting region, without the use of any polarizer to adjust beams by absorbing polarized light parallel to the absorption axis of the polarizer. The utilization rate of beams is increased, such that the transmission rate of beams in the display panel is increased.

Some embodiments of the present disclosure provide a control method of a display device, and the method may be applied to the display device as shown in FIG. 9 or 10. The method may include:

controlling deflection of liquid crystals in the liquid crystal layer by controlling a voltage on the regulation electrode, such that beams incident obliquely towards the light shielding region are reflected by the liquid crystal layer corresponding to the light shielding region to the light transmitting region.

To sum up, the control method of the display device as provided by some embodiments of the present disclosure may control deflection of liquid crystals in the liquid crystal layer with the regulation electrode in the liquid crystal regulation unit, such that beams incident obliquely towards to the light shielding region are partially or totally reflected by the liquid crystal layer corresponding to the light shielding region to the light transmitting region, without the use of any polarizer to adjust beams by absorbing polarized light parallel to the absorption axis of the polarizer. The utilization rate of beams is increased, such that the transmission rate of beams in the display panel is increased.

Optionally, the regulation electrode 31a may include: a first transparent electrode a1 and a second transparent electrode a2, and a liquid crystal layer 31b is provided between the first transparent electrode a1 and the second transparent electrode a2. Assume that the first transparent electrode a1 is located on a light emissive side of the liquid crystal layer 31b, and the second transparent electrode a2 is located on a light incident side of the liquid crystal layer 31b. As an example, the regulation electrode 31a may include: a plate-shaped first transparent electrode a1, and a plurality of bar-shaped second transparent electrodes a2 arranged in an array, the second transparent electrodes a2 including electrodes a21 and a22. A first voltage may be applied to the electrode a21, and a second voltage may be applied to the electrode a22. By controlling a voltage on the regulation electrode, deflection of liquid crystals in the liquid crystal layer is controlled, such that beams incident from the backlight source are emitted to the light shielding region and/or the light transmitting region through the liquid crystal layer. A display of different gray scale images is realized, and may specifically include the following three circumstances: A first circumstance is to control, when it is necessary to display a zero gray scale image, non-deflection of liquid crystals in the liquid crystal layer by controlling a voltage on the regulation electrode, such that beams incident obliquely towards the light shielding region are emitted to the light shielding region. For example, by controlling a voltage between the first transparent electrode and the second transparent electrode, beams incident from the backlight source may be emitted to the light shielding region through the liquid crystal layer between the first transparent electrode and the second transparent electrode.

Optionally, referring to FIG. 6, when the first voltage and the second voltage are zero volt (that is, no voltage difference is formed on the regulation electrode 31a), liquid crystal molecules in the liquid crystal layer are not deflected, and the refractive index of the first liquid crystal region b1 corresponding to the electrode a21 is equal to that of the second liquid crystal region b2 corresponding to the electrode a22. The incident beams γ emitted from the light emitting unit 201 do not satisfy conditions for a total reflection, and are totally emitted to the light shielding region 104 through the liquid crystal layer, and a zero gray scale image is displayed. A second circumstance is to control, when it is necessary to display a maximum gray scale image, deflection of liquid crystal in the liquid crystal layer by controlling a voltage on the regulation electrode to make the refractive index of liquid crystals in the liquid crystal layer corresponding to the light transmitting region greater than the refractive index of liquid crystals in the liquid crystal layer corresponding to the light shielding layer, such that beams incident obliquely towards the light shielding region are reflected (for example, totally reflected) by the liquid crystal layer corresponding to the light shielding region to the light transmitting region. For example, by controlling a voltage between the first transparent electrode and the second transparent electrode, beams incident from the backlight source may be emitted to the scattering medium pattern through the liquid crystal layer between the first transparent electrode and the second transparent electrode.

Optionally, the maximum gray scale image may be a 255 gray scale image.

Optionally, referring to FIG. 5, when the first voltage is greater than the second voltage, the extent of deflection of liquid crystals in the first liquid crystal region b1 corresponding to the electrode a21 is greater than the extent of deflection of liquid crystals in the second liquid crystal region b2 corresponding to the electrode a22, such that liquid crystal regions with different refractive indexes may be formed in the same pixel unit. When incident beams γ emitted from the light emitting unit 201 are incident from a first crystal region b1 having a high refractive index (an optically denser medium) to a second liquid crystal region b2 having a low refractive index (an optically thinner medium), and the incident angle β satisfies sin β≥t1/t2, where t1 is the refractive index of the first liquid crystal region, and t2 is the refractive index of the second liquid crystal region, a total reflection of incident beams γ may occur, the incident beams γ are totally reflected to the light transmitting region 105, and a maximum gray scale image is displayed.

A third circumstance is to control, when it is necessary to display an n gray scale image, deflection of liquid crystals in the liquid crystal layer by controlling a voltage on the regulation electrode, such that one portion of the incident beams incident obliquely towards the light shielding region is emitted to the light shielding region, and the other portion is emitted to the light transmitting region, where 0<n<m, and m is the maximum gray scale. Specifically, by controlling a voltage between the first transparent electrode and the second transparent electrode, one portion of beams incident from the backlight source may be emitted to the light shielding region and the other portion may be emitted to the scattering medium pattern, through the liquid crystal layer between the first transparent electrode and the second transparent electrode, where 0<n<m, and m is the maximum gray scale, for example, m may be 255.

Optionally, referring to FIG. 7, the second transparent electrode a2 may further include electrodes a23 and a24, wherein the electrode a23 corresponds to a third liquid crystal region b3, and the electrode a24 corresponds to a fourth liquid crystal region b4. Different voltages may be applied to the electrodes a21, a22, a23 and a24, respectively, such that one portion of the incident beams γ1 emitted from the light emitting unit 201 is incident from the first liquid crystal region b1 to the second liquid crystal region b2, and emitted to the light shielding region 104, without the occurrence of a total reflection, and the other portion of incident beams γ2 is incident from the third liquid crystal region b3 to the fourth liquid crystal region b4, and reflected to the light transmitting region 105, with the occurrence of a total reflection, and an n gray scale image may be displayed, where 0<n<m, and m is the maximum gray scale, for example m may be 255.

Optionally, a voltage applied between the first transparent electrode and the second transparent electrode is in a range of 0 to 8 volts, and the refractive index of the liquid crystal layer is commonly in a range of 1.5 to 1.8. Referring to FIG. 4A, a specific relationship between a magnitude of the applied voltage and the refractive index of liquid crystals is shown, where the ordinate represents voltage in volts, and the abscissa represents the refractive index of liquid crystal. When the voltage is between 2 to 8 volts, the greater the voltage, the higher the refractive index of liquid crystal. As an example, when the voltage is 0 to 2 volts, the refractive index of liquid crystal is 1.5, and when the voltage is increased to 8 volts or more, the refractive index of liquid crystal is 1.8.

Optionally, a process of causing, by controlling a voltage between the first transparent electrode and the second transparent electrode, beams incident from the backlight source to be emitted to the light shielding region and/or the light transmitting region through the liquid crystal layer between the first transparent electrode and the second transparent electrode, may include:

S1. determining a target gray scale to be displayed;

S2. inquiring a correspondence between the preset gray scale and the voltage to obtain a target voltage corresponding to the target gray scale;

S3. applying the target voltage between the first transparent electrode and the second transparent electrode, to cause beams incident from the backlight source to be emitted to the light shielding region and/or the light transmitting region through the liquid crystal layer between the first transparent electrode and the second transparent electrode.

Figure 11:
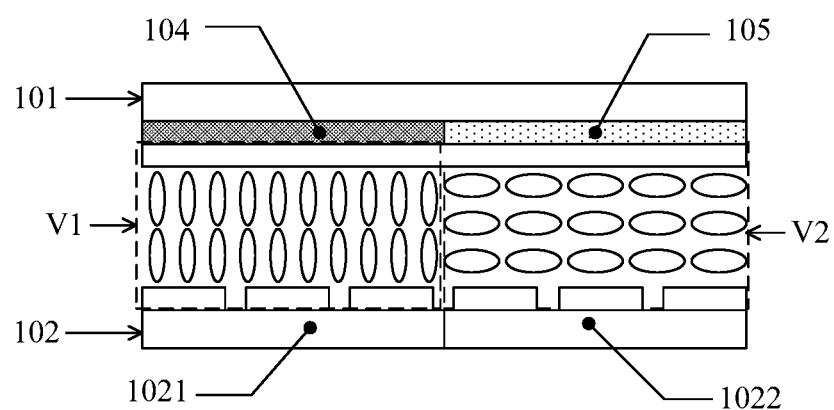
FIG. 11 is a schematic diagram of applying a voltage when a display device displays a maximum gray scale image as provided by some embodiments of the present disclosure.

It should be noted that, as shown in FIG. 11, the two base substrates may include a first base substrate 101 and a second base substrate 102. The light shielding region 104 and the light transmitting region 105 are provided on the first base substrate 101, and the second base substrate 102 includes a first light transmitting region 1021 and a second light transmitting region 1022. The first light transmitting region 1021 is an orthogonal projection region of the light shielding region 104 on the second base substrate 102, and the second light transmitting region 1022 is an orthogonal projection region of the light transmitting region 105 on the second base substrate 102.

As an example, when it is necessary to display a zero gray scale image, a voltage applied between the first transparent electrode and the second transparent electrode may be zero volt, and incident beams are emitted to light shielding region and totally shielded by the light shielding region. When it is necessary to display a maximum gray scale image, as shown in FIG. 11, a second voltage applied to an electrode V1 between the first light transmitting region 1021 and the light shielding region 104 may be zero volt, and a first voltage applied to an electrode V2 between the second light transmitting region 1022 and the light transmitting region 105 may be 8 volts. When incident beams, whose incident angle is greater than or equal to 56 degrees, are incident from the liquid crystal layer of the light transmitting region to the liquid crystal layer of the light shielding region, a total reflection may occur, and a maximum gray scale image may be displayed. One may refer to FIG. 5 for the specific process of beam transmission, which is omitted here.

It should be noted that, an order of steps of the control method of the display device as provided by some embodiments of the present disclosure may be properly adjusted, and the steps may also be increased/decreased accordingly based on situations. Any varied method within the technical scope as revealed by the present disclosure that can be readily conceived by those skilled in the technical art should be covered within the protection scope of the present disclosure, and thus is not described further.

Those skilled in the art may clearly understand that, for convenient and concise descriptions, one may refer to the corresponding process in the aforementioned embodiments of the display panel and display device for the specific steps of the above-described method, which are omitted here.

To sum up, the control method of the display device as provided by some embodiments of the present disclosure may control deflection of liquid crystals in the liquid crystal layer by controlling the regulation electrode in the liquid crystal regulation unit, such that beams incident obliquely towards the light shielding region are totally reflected by the liquid crystal layer corresponding to the light shielding region to the light transmitting region, without the use of any polarizer to adjust beams by absorbing polarized light parallel to the absorption axis of the polarizer. The utilization rate of beams is increased, such that the transmission rate of beams in the display panel is increased.

Some embodiments of the present disclosure provide a method of manufacturing the display panel, comprising:

providing two base substrates;

forming a plurality of liquid crystal units between the two base substrates, each of the plurality of liquid crystal units including: a regulation electrode and a liquid crystal layer, and the regulation electrode is used for controlling deflection of liquid crystals in the liquid crystal layer, such that beams incident obliquely towards the light shielding region are reflected by the liquid crystal layer corresponding to the light shielding region to the light transmitting region.

To sum up, the method of manufacturing the display panel as provided by some embodiments of the present disclosure comprises forming a plurality of liquid crystal regulation units between the two base substrates, each of the plurality of liquid crystal units including: a regulation electrode and a liquid crystal layer, and the regulation electrode is used for controlling deflection of liquid crystals in the liquid crystal layer, and adjusting the direction of beams incident to the liquid crystal regulation unit. After beams pass through the liquid crystal layer, deflection of liquid crystals in the liquid crystal layer may be controlled by the regulation electrode in the liquid crystal regulation unit, such that beams incident obliquely towards the light shielding region are partially or totally reflected by the liquid crystal layer corresponding to the light shielding region to the light transmitting region, without the use of any polarizer to adjust beams by absorbing polarized light parallel to the absorption axis of the polarizer. The utilization rate of beams is increased, such that the transmission rate of beams in the display panel is increased.

Optionally, the two base substrates may include a first base substrate and a second base substrate, and the process of forming a plurality of liquid crystal regulation units between the two base substrates may include:

A1. Forming a plurality of light shielding regions and a plurality of light transmitting regions on the first base substrate.

Optionally, the light shielding region may be provided with a Black Matrix thereon, and the light transmitting region may be provided with a scattering medium pattern thereon. Specifically, firstly a photosensitive material layer may be formed on the first base substrate, and exposure and development are performed for the photosensitive material layer to obtain a Black Matrix. Then, a scattering medium layer is formed on the first base substrate, and then a plurality of scattering medium patterns are formed through one patterning process, wherein the one patterning process may include: photoresist coating, exposure, development, etching and photoresist stripping.

A2. Forming a first transparent electrode on the first base substrate on which the plurality of light shielding regions and the plurality of scattering medium patterns are formed.

Optionally, there may be one or more said first transparent electrodes. When there is one said first transparent electrode, it is a plate-shaped transparent electrode, and the first transparent electrode may be formed by one of multiple ways including deposition, coating, sputtering and so on. When there are a plurality of said first transparent electrodes, a plurality of bar-shaped first transparent electrodes arranged in an array are formed on the first base substrate. A transparent electrode layer may be formed on the first base substrate, and then the plurality of bar-shaped first transparent electrodes arranged in an array may be formed through one patterning process.

A3. Forming an alignment layer on the first base substrate on which the first transparent electrode is formed.

Optionally, the alignment layer may be formed on the first base substrate on which the first transparent electrode is formed by one of multiple ways including deposition, coating, sputtering and so on.

A4. Forming a second transparent electrode on the second base substrate.

Optionally, there may be one or more said second transparent electrodes. When there is one said second transparent electrode, it is a plate-shaped transparent electrode, and the second transparent electrode may be formed by one of multiple ways including deposition, coating, sputtering and so on. When there are a plurality of said second transparent electrodes, a plurality of bar-shaped second transparent electrodes arranged in an array are formed on the second base substrate. A transparent electrode layer may be formed on the second base substrate, and then the plurality of bar-shaped second transparent electrodes arranged in an array may be formed through one patterning process.

It should be noted that, at least one of the first transparent electrode and the second transparent electrode is the plurality of bar-shaped electrodes arranged in an array.

A5. Forming an alignment layer on the second base substrate on which the second transparent electrode is formed.

Optionally, the alignment layer may be formed on the second base substrate on which the second transparent electrode is formed by one of multiple ways including deposition, coating, sputtering and so on.

A6. Dripping liquid crystals between the first base substrate and the second base substrate, and box molding a pair of the first base substrate and the second base substrate to obtain a display panel, in which a film layer between the first base substrate and the second base substrate may be divided into the plurality of liquid crystal regulation units described above.

It should be noted that, as shown in FIG. 1A, a film layer between the first base substrate 101 and the second base substrate 102 in the display panel may be divided into the plurality of liquid crystal regulation units 103 described above. One may refer to FIG. 1B for the specific structure of the liquid crystal regulation unit 103, which is omitted here.

It should be noted that, the method of manufacturing the display panel as provided by some embodiments of the present disclosure is only an exemplary explanation. Other manners may also be used in practical application, which are not limited by some embodiments of the present disclosure. Further, an order of steps of some embodiments of the present disclosure may be properly adjusted, and the steps may also be increased/decreased accordingly based on situations. Any varied method within the technical scope as revealed by the present disclosure that can be readily conceived by those skilled in the technical art should be covered within the protection scope of the present disclosure, and thus is not described further.

Those skilled in the art may clearly understand that, for convenient and concise descriptions, one may refer to the corresponding process in embodiments of the aforementioned display panel and display device for the specific steps of the above-described method, which are omitted here.

To sum up, the manufacturing method of the display device as provided by some embodiments of the present disclosure comprises forming a plurality of liquid crystal regulation units between two base substrates, each of the plurality of liquid crystal units including: a regulation electrode and a liquid crystal layer, wherein the regulation electrode is used for controlling deflection of liquid crystals in the liquid crystal layer, and adjusting the direction of beams incident to the liquid crystal regulation unit. After beams pass through the liquid crystal layer, deflection of liquid crystals in the liquid crystal layer may be controlled by the regulation electrode in the liquid crystal regulation unit, such that beams incident obliquely towards the light shielding region are partially or totally reflected by the liquid crystal layer corresponding to the light shielding region to the light transmitting region, without the use of any polarizer to adjust beams by absorbing polarized light parallel to the absorption axis of the polarizer. The utilization rate of beams is increased, such that the transmission rate of beams in the display panel is increased.

All the above are only alternative embodiments of the present disclosure, and not used to limit the present disclosure. Any modification, equivalent replacement, improvement or the like that is within the spirits and principles of the present disclosure should be contained within the protection scope of the present disclosure.

What is claimed is:

1. A display panel, comprising:
   two base substrates oppositely provided;
   a liquid crystal regulation unit provided between the two base substrates; and
   a light shielding region and a light transmitting region located on a light emissive side of the liquid crystal regulation unit,
   wherein, the liquid crystal regulation unit includes a regulation electrode and a liquid crystal layer, and the regulation electrode is configured to control deflection of liquid crystals in the liquid crystal layer, such that beams incident obliquely towards the light shielding region are reflected to the light transmitting region by liquid crystals in the liquid crystal layer corresponding to the light shielding region,
   wherein the reflection of the beams incident obliquely towards the light shielding region to the light transmitting region by liquid crystals in the liquid crystal layer includes a total reflection or a partial reflection.

2. The display panel according to claim 1, wherein, the regulation electrode is a transparent electrode and includes a first transparent electrode and a second transparent electrode, wherein, the liquid crystal layer is provided between the first transparent electrode and the second transparent electrode.

3. The display panel according to claim 2, wherein,
   the regulation electrode includes at least one of:
   a plate-shaped first transparent electrode and a plurality of bar-shaped second transparent electrodes arranged in an array; or
   a plurality of bar-shaped first transparent electrodes arranged in an array and a plurality of bar-shaped second transparent electrodes arranged in an array, and the plurality of bar-shaped first transparent electrodes and the plurality of bar-shaped second transparent electrodes are in a one-to-one correspondence.

4. The display panel according to claim 1, wherein,
   the light transmitting region is provided with a scattering medium pattern thereon;
   the light shielding region is provided with a Black Matrix thereon.

5. The display panel according to claim 4, wherein,
   the light transmitting region is provided with at lease one of a Quantum Dots pattern thereon or a color filter thereon, and scattered particles are attached to the color filter.

6. The display panel according to claim 1, wherein the liquid crystal regulation unit further includes:
   an alignment layer located on both sides of the liquid crystal layer.

7. A display device, comprising:
   the display panel according to claim 1, wherein the display panel comprises a plurality of liquid crystal regulation units and a plurality of light shielding regions and a plurality of light transmitting regions corresponding to the plurality of liquid crystal regulation units; and
   a backlight source provided on a light incident side of the display panel, the backlight source including a plurality of light emitting units arranged in an array, and the plurality of light emitting units and the plurality of light transmitting regions of the plurality of liquid crystal regulation units being in a one-to-one correspondence.

8. The display device according to claim 7, wherein,
   an incident angle of beams of each light emitting unit of said plurality of light emitting units is greater than or equal to a critical angle $\theta$ of a total reflection of liquid crystals in the liquid crystal layer, wherein the two base substrates are provided in parallel, and the incident angle of beams is equal to an angle between the beams and either of said base substrates.

9. The display device according to claim 8, wherein,
   the critical angle $\theta$ satisfies $\theta=\sin^{-1}(n_0/n_e')$;
   wherein, $n_0$ is a minimum refractive index of the liquid crystal layer; $n_e'$ is a maximum refractive index of the liquid crystal layer.

10. The display device according to claim 8, wherein, a refractive index of the liquid crystal layer is in a range of 1.5 to 1.8, and the critical angle $\theta$ is 56 degrees.

11. The display device according to claim 7, wherein,
    each light emitting unit of the plurality of light emitting unit includes: a collimation system, a wire grid polarizer and a light emitting diode (LED) sequentially provided in a direction distal to the display panel.

12. A method for controlling a display device, wherein the method is applied to the display device according to claim 7, the method comprising:
    controlling deflection of liquid crystals in the liquid crystal layer by controlling a voltage on the regulation electrode, such that beams incident obliquely towards the light shielding region are reflected to the light transmitting region by liquid crystals in the liquid crystal layer corresponding to the light shielding region.

13. The method according to claim 12, wherein, controlling deflection of liquid crystals in the liquid crystal layer by controlling a voltage on the regulation electrode, such that beams incident obliquely towards the light shielding region are reflected to the light transmitting region by liquid crystals in the liquid crystal layer corresponding to the light shielding region comprises:
    controlling, to display a maximum gray scale image, deflection of liquid crystals in the liquid crystal layer by controlling a voltage on the regulation electrode, to make a refractive index of liquid crystals in the liquid crystal layer corresponding to the light transmitting region greater than a refractive index of liquid crystals in the liquid crystal layer corresponding to the light shielding region, such that beams incident obliquely towards the light shielding region are reflected to the light transmitting region by liquid crystals in the liquid crystal layer corresponding to the light shielding region.

14. The method according to claim 13, wherein, the method further comprises:
   controlling, to display a zero gray scale image, non-deflection of liquid crystals in the liquid crystal layer by controlling a voltage on the regulation electrode, such that beams incident obliquely towards the light shielding region are emitted to the light shielding region.

15. The method according to claim 13, wherein, the method further comprises:
   controlling, to display a zero gray scale image, refractive indexes of liquid crystals in the liquid crystal layer to be identical by controlling a voltage on the regulation electrode, such that beams incident obliquely towards the light shielding region are emitted to the light shielding region.

16. The method according to claim 13, wherein, the method further comprises:
   controlling, to display a zero gray scale image, the refractive index of liquid crystals in the liquid crystal layer corresponding to the light shielding region to be less than the refractive index of liquid crystals in the liquid crystal layer corresponding to the light transmitting region by controlling a voltage on the regulation electrode, such that beams incident obliquely towards the light shielding region are emitted to the light shielding region.

17. The method according to claim 14, wherein, the method further comprises:
   controlling, to display an n gray scale image, deflection of liquid crystals in the liquid crystal layer by controlling a voltage on the regulation electrode, such that one portion of the beams incident obliquely towards the light shielding region is emitted to the light shielding region, and another portion is emitted to the light transmitting region, where $0<n<m$, and m is a maximum gray scale.

* * * * *